United States Patent [19]
Olson

[15] 3,705,453
[45] Dec. 12, 1972

[54] PIPE CENTERING JIG
[72] Inventor: Neil W. Olson, 417 Afton Ave., Murray, Utah 84107
[22] Filed: Nov. 13, 1970
[21] Appl. No.: 89,226

[52] U.S. Cl..................29/200 P, 228/44, 269/131, 269/201
[51] Int. Cl.........................B23k 37/04, B23p 19/00
[58] Field of Search.........29/200 P; 228/4, 6, 15, 44; 269/130, 131, 201, 228, 287

[56] References Cited

UNITED STATES PATENTS

| 2,127,828 | 8/1938 | Milton | 269/287 X |
| 2,846,968 | 8/1958 | Tipton | 269/201 |
| 3,284,883 | 11/1966 | Haverfield et al. | 269/201 X |
| 3,422,519 | 1/1969 | Fehlman | 269/201 X |
| 3,593,402 | 7/1971 | Mori | 269/131 X |

Primary Examiner—Theron E. Condon
Assistant Examiner—Neil Abrams
Attorney—M. Ralph Shaffer

[57] ABSTRACT

A flexible elongate clamping device constructed for temporary securement about a pair of adjacent pipe sections which are to be welded or otherwise secured together. The device preferably takes the form of a pair of mutually-spaced, elongate, link-type chains having mutually spaced cross-plates secured thereto at corresponding links thereof. Such plates accommodate central bolts having tapered ends for aiding the selection of the desired spacing between the adjacent pipe sections prior to tack welding thereof. Likewise, the cross-plates accommodate other, side adjustment means for insuring the mutual co-axial alignment of the adjacent pipe sections, whether their outside diameters differ or whether the configuration of such adjacent pipe sections assumes a rectilinear or even a curved form.

10 Claims, 7 Drawing Figures

PATENTED DEC 12 1972

3,705,453

PIPE CENTERING JIG

The present invention relates to holding devices temporarily installed upon adjacent pipe sections for holding the same together in co-axial alignment and in selected space relationship, and, more particularly, to a device which is easily positioned, lengthened, or shortened, and easily removed to accommodate a wide variety of diameter sizes of pipe sections to be joined.

In the plumbing art especially, there has persisted a very real problem of pre-positioning and holding a pair of pipe sections together prior to joining thereof as by preliminary tack welding. Pipe sections, particularly those in buildings and other installations, can be quite heavy, and it is extremely difficult for heavy pipe sections to be retained in place either by hand or by existing machinery such that a pipe section to be added can be held in exact alignment with and in appropriate spaced relationship with respect to an existing pipe section. Of course, once two adjacent pipe sections are in fact held together appropriately, then the same can be tack welded together and any holding device removed so that the welding function can be performed completely about the periphery of the juncture of the two sections involved.

Accordingly, the principal object of the present invention is to provide a claimping device for temporarily holding two pipe sections together in axial alignment such that necessary fastening means relative to the two pipe sections can be supplied, as by welding, attachments, or other means.

A further object of the present invention is to provide a new and improved device for physically retaining two pipe sections in approximate alignment as to their ends, and this regardless of the shape of the pipe sections or their respective diameters.

An additional object is to provide a device for temporarily holding a pair of pipe sections in selected space relationship, this in order that proper welding can be effected.

A still further object of the present invention is to provide a device for temporarily holding a pair of pipe sections in axial alignment and in proper spacing so that the particular weld or tack weld needed to join the pipes together for the pipe sizes and materials in question can be accomplished.

In accordance with the present invention, the same comprises an elongate clamping device which is flexible and which can assume a closed, arcuate condition about a pair of pipe sections, for clamping the same mutually together in coaxial alignment. The device preferably takes the form of a pair of elongate, link-type chains which are joined together by cross-plates at mutually spaced, corresponding links. These plates are constructed to receive both central and end positioning means, preferably taking the form of threaded bolts. The same are used for correctly, co-axially aligning the pipe sections, and, additionally, for spacing the ends apart for suitably tack welding. Selection in spacing can be varied, by virtue of the conical ends, of the central spacing bolts, so that varying wall thicknesses and sizes of pipe can be accommodated. An adjustable over-toggle action is employed for tight securement of the device about the ends of adjacent pipe sections.

The features of the present invention which are believed to be novel are set forth with particularity in the appended claims. The present invention, both as to its organization and manner of operation, together with further objects and advantages thereof, may best be understood by reference to the following description, taken in connection with the accompanying drawings in which:

Figure 1:
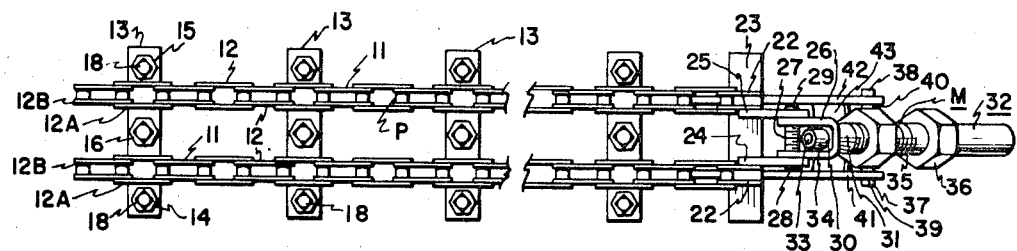
FIG. 1 is a fragmentary plan view of the flexible elongate clamping device of the present invention in a preferred embodiment thereof.
Figure 2:
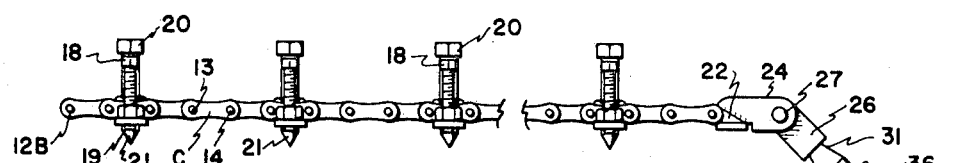
FIG. 2 is a side elevation of the device of FIG. 1, illustrating at the right side thereof one form of securement mechanism whereby the device can be clamped around a pair of pipe sections to be joined.
Figures 3, 4, 5, 6, 7:
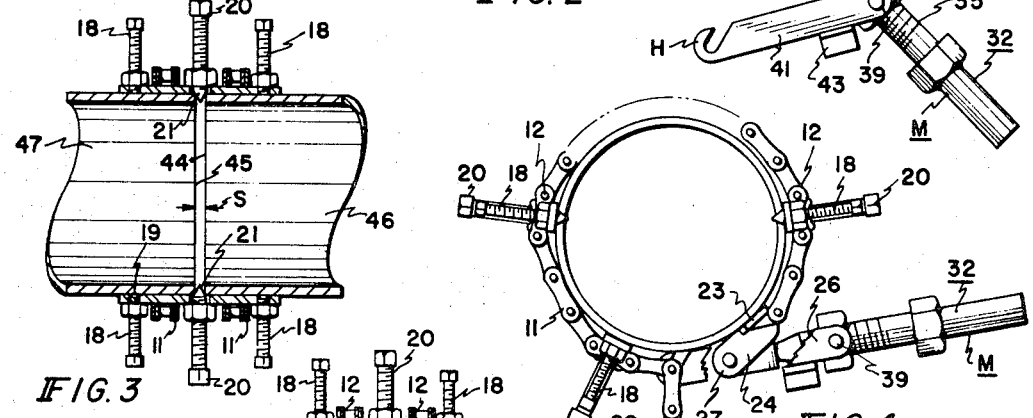
FIG. 3 is a fragmentary, vertical section of a pair of pipes of equivalent diameter being positioned by the device for co-axial alignment and proper end spacing.
FIG. 4 is a transverse section of the structure of FIG. 3, illustrating the manner in which the elongate, flexible clamping device of the present invention appears when the same is positioned about the pair of pipes to be joined.
FIG. 5 is similar to FIG. 4, illustrating use of the device in connection with a pair of pipe sections to be joined where the pipe sections differ as to outside wall-diameter.
FIG. 6 is a fragmentary section similar to FIG. 5, but wherein the pipe sections to be joined are both curved and straight, respectively.
FIG. 7 is a view similar to FIG. 4, but illustrates temporary positioning of the device about a pipe section prior to overtoggling to the handle or shaft position shown in FIG. 4.

In FIGS. 1 and 2 the device 10 of the present invention is shown to include a pair of link-type chains 11, each being comprised of a plurality of links 12 pivoted together by link pins 13 and 14 as is customary with such chains. Joined to and spaning the chains 11 are mutually spaced plates 13 which are welded to specific links 12A or other wise fixedly secured thereto. Plates 13 may include upstanding bosses 14 and 15, termed "end" bosses, and also a center boss 16. All the bosses may comprise nuts welded to the individual plates, by way of example. Optionally, of course, the plates may be simply drilled and tapped at the end and central areas to provide threaded apertures thereat. Where bosses are supplied, or where the plates are simply drilled and tapped, the apertures 15 and 16 will be threaded for the reception of spacer bolts 18 disposed in each of the threaded apertures. Spacer bolts 18 are not shown in FIG. 1, for the convenience of illustration, but all are illustrated in FIGS. 2 and 5 by way of example.

The spacer bolts 18 have squared ends 19 as seen in FIG. 2. The central bosses 16, however, receive pipe-end spacing bolts 20 with tapered or conical ends 21.

It is here to be observed that the individual pair of chains 11 in FIG. 1 may be as long as desired; additionally, the device may be supplied additional lengths of chain pairs that can be connected to the end links 12B, see FIG. 1. Additional segments of the composite chain, i.e., the chain pair 11 with their spanning plates, may be color coded or otherwise treated or conditioned such that the user will know the approximate length of the positioning chain device he is using for a given pipe installation.

In any event, the device 10 will be supplied with a suitable mechanism M designed to releasably secure the chain about a given, proposed pipe installation. Thus, terminal links 22 may be welded to opposite sides of terminal plate 23, and angulated in a form as shown in FIG. 2, if desired. Welded to the inside surfaces of the terminal links are mounting ears 24 and 25. These interiorly receive a clevis 26 which is pivotally joined to the mounting ears by means of a threaded stud 27 threaded through threaded apertures 28 and 29 of the mounting ears. Other types of journalling means are of course possible. In any event, the clevis proves a central aperture 30 which receives the turned-down end 31 of rotatable shaft 32. Shaft 32 may include an enlarged button retainer end 33 for bearing against a bearing sleeve 34 for the handle (shaft 32).

The shaft 32 is threaded at 35, which threaded portion 35 receives a nut 36. Nut 36 includes pivot extremities 37 and 38 which are positioned in apertures 39 and 40 of securement members 41 and 42 here shown in the form of hooks, by way of example. The hooks may be joined by spanning member 43 of arcuate form to keep the hooks in position, such spanning member 43 can be positioned as by welding to the individual hooks after the hooks are implaced over the pivot extremities 37 and 38.

Accordingly, it is seen that the forward end of the shaft 32 is journalled relative to the clevis 26 so as to be rotatable with respect thereto without being separable therefrom.

In operation, the securement members 41 and 42, having the respective hook end portions H, are joined to corresponding central links C of the individual links 12, or the end links 12B at their respective pivot portions, or some other links. FIG. 7, by way of example, illustrates the hook portion H as being engaged with the selected links, that is, the spanding cylindrical portions P thereof with, the device M serving as an overtoggling device. Thus, for a particular installation approximate to or slightly-oversized, arcuate length of the chain pair necessary for installation is determined and the securement members 41 and 42 positioned to engage the correct links; at this point the shaft 32 is urged inwardly, to over-toggle in the direction of the arrow shown in FIG. 7, so that the device will be clamped tightly over the pipe installation in question in the manner shown in FIG. 4. Subsequently, welding or other attachment can take place.

The function of the central, threaded pipe-end spacing bolts 20 is illustrated particularly in FIG. 3 wherein it is seen that the tapered or conical ends 21 thereof may be utilized to space apart correctly the ends 44 and 45 of pipe sections 46 and 47, respectively. The pipes illustrated in FIG. 3 are equivalent in diameter and in wall thickness. In such event, the positioning bolts 18 need not be employed or, if employed, can be disposed upwardly such that their lower surfaces 19 are coplanar with the bottom surfaces of the respective plates 13. See for example the left-hand side of FIG. 5.

Adjustment up and down on the bolts 20 will serve either to increase or decrease the spacing S between the two ends 44 and 45 in FIG. 3. This can be adjusted completely around the pipes being joined so that a proper welding procedure may be followed to secure the two pipe sections in a conventional manner.

FIG. 4 illustrates the condition of the structure in FIG. 3 when the chain device of the present invention is installed in place tightly about the pipes.

Suppose that one pipe section is of smaller diameter than is to be joined. This condition is shown in FIG. 5. In such event the left-hand bolts 18 need not be extended through their respective plates; rather, the plates 13 themselves will be sufficient to maintain the pipe section 48 in place. Likewise, the central bolts 20 can be adjusted to adjust the space S1 for proper welding. To secure the remaining pipe section 49 (on the right) in position, then the ends of the bolts 18 will be extended inward beyond their plates through turning of the bolts such that these ends engage correctly the outside surface of the pipe section 49. This can be accomplished by the bolts being turned equivalently completely about the periphery of the pipe section 49 so that the latter may be centrally and coaxially disposed relative to pipe section 48. Subsequently the welding function may be performed. In all cases, after the initial welding or "tacking" is performed, the pipe-section chain member can be removed and the welding completed completely around the juncture.

FIG. 6 illustrates the situation wherein a straight pipe section 49 is joined this time to a curved pipe section or elbow 50. In such event, the central spacer bolts 20 again may be used to space correctly the adjacent ends 51 and 52, whereas the bolts 18 may be independently adjusted as to opposite sides of their respective plates 13 so that the two pipes are held concentrically as to their ends. Thus, the lower bolts 18 on the left-hand side of FIG. 6 will be adjusted such that the engaging ends E advance downwardly and toward the associated plates 13. Correspondingly, the upper bolts 18 and the left-hand side of FIG. 6 will likewise be advanced such that their ends E' advance away from the associated plate 13. Corresponding adjustments can be made relative to bolts 18 of the right-hand side of FIG. 6, both above and below pipe section 49, so that the latter may be held concentrically with the elbow 15.

It is seen that the chain device of the present invention is and represents an ideal device for use at the job site, to position together in close proximity and in aligned condition a pair of adjacent pipe sections, and this whatever the configuration, straight or curved, of the pipe line to be secured. Adjustment means is provided in the presence of bolts 20, whereby to insure that correct spacing between the pipe section is maintained during the initial tack-welding procedures. Subsequently, the device can be removed for completing the welding function. The positioning bolts 18, on the other hand, are for the purpose of insuring a correct coaxial positioning of two pipe sections to be joined, whatever the longitudinal configuration of the pipe sections, that is whether each are straight or curved, or even of the same diameter.

What is provided, hence, is an extremely versatile, pipe section holding device to accommodate a wide variety of pipe configuration and installation conditions.

While particular embodiments of the present invention have been shown and described, it will be obvious to those skilled in the art that changes and modifications may be made without departing from this invention in its broader aspects, and, therefore, the aim in the appended claims is to cover all such changes and modifications as fall within the true spirit and scope of the present invention.

I claim:

1. A clamping device for positioning two adjacent pipe sections, having adjacent ends to be joined, in desired mutual alignment, including, in combination: a pair of mutually spaced, flexible, elongate, link chains constructed for respective disposition about respective ones of said pipe sections, each of said chains having plural, mutually-spaced inter-link linking structures, first means for securing said chains about said pipe sections, said first means including a pair of parallel, laterally interconnected hook means dimensioned to releasably engage simultaneously, selected corresponding linking structures of said chains, and second means secured to and between said chains for spanning across the adjacent ends of said pipe sections.

2. The combination of claim 1 wherein said first means includes overtoggling structural means connected to said hook means and secured to one region of said pair of chains, for releasably engaging via said hook means a second region of said pair of chains, to thereby secure said chains about said pipe sections.

3. The combination of claim 1 wherein said first means includes: an overtoggling handle having a threaded shaft portion, third structural means for journallingly securing said handle to said pair of chains, threaded means rotatably secured to said shaft portion, and fourth means comprising said pair of hook means and engagable thereby with said chains and pivotally secured to said threaded means for securing said chains about said pipe sections.

4. The combination of claim 3 wherein said fourth means comprise a pair of securement members, as said hook means, having hook-configured end portions releasably secured to selected portions of said chains.

5. The combination of claim 1 wherein said second means comprise plural, mutually spaced plates connected to and transversely disposed across corresponding links of said chains.

6. A clamping device for positioning two adjacent pipe sections, having adjacent ends to be joined, in desired mutual alignment, including, in combination: a pair of mutually spaced, flexible, elongate, link chains constructed for respective disposition about respective ones of said pipe sections, first means for securing said chains about said pipe sections, and second means secured to and between said chains for spanning across the adjacent ends of said pipe sections, wherein said second means comprises plural, mutually spaced plates connected to and transversely disposed across said chains, and wherein said plates each include a central, threaded aperture, said combination including plural threaded elongate means respectively threaded through said central aperture and constructed for spacing said pipe sections apart a desired distance.

7. The combination of claim 6 wherein each of said threaded elongate means includes a tapered end for adjustably spacing apart said pipe sections.

8. A clamping device for positioning two adjacent pipe sections, having adjacent ends to be joined, in desired mutual alignment, including, in combination: a pair of mutually spaced, flexible, elongate, link chains constructed for respective disposition about respective ones of said pipe sections, first means for securing said chains about said pipe sections, and second means secured to and between said chains for spanning across the adjacent ends of said pipe sections, wherein said second means comprise plural, mutually spaced plates connected to and transversely disposed across said chains, wherein said each of plates include side threaded apertures, and threaded elongate means threaded into said side threaded apertures for adjustably engaging said pipe sections, to thereby concentrically align said pipe sections as to their respective ends, and wherein said plates also include respective, central apertures, the combination including additional threaded elongate means respectively threaded through said central apertures for spacing said pipe sections apart a chosen distance.

9. A clamping device for positioning two adjacent pipe sections for mutual securement at adjacent ends and including, in combination, a pair of first means for clampingly encompassing respective ones of said pipe sections about a major portion of their respective peripheries, second means spanning over the adjacent ends of said pipe sections and affixed to and across said first means, and adjustment means engaging said second means for spacing said pipe section ends a predetermined distance apart, said adjustment means comprising adjustment screw means threaded through said second means and having interior tapered end means for simultaneously engaging and thereby selectively mutually spacing said adjacent ends a desired distance apart.

10. The combination of claim 9 wherein said second means includes means, disposed on opposite sides of said adjustment means, for coaxially aligning said adjacent ends of said pipe sections.

* * * * *